Patented Oct. 18, 1938

2,133,362

UNITED STATES PATENT OFFICE 2,133,362

FEED AND METHOD OF MAKING THE SAME

Charles F. Schnabel, Kansas City, Kans., assignor to American Dairies, Incorporated, Kansas City, Mo., a corporation of Maryland No Drawing. Application December 30, 1935, Serial No. 56,769

7 Claims. (Cl. 99—2)

My invention relates to feeds and more particularly to a high nutritive value feed for animal or human consumption.

This invention is an improvement of the invention described in my Letters Patent 1,942,943, bearing date January 9, 1934.

In my Patent 1,942,943, I disclosed the high nutritive value of immature grasses and a feed which comprised dried immature grasses. Certain of the more labile constituents of the grasses are destroyed by dehydration. This is probably due to oxidation of the carotene content and the polymerization of unsaturated lipins, aromatic and unsaturated compounds.

Grasses are herbs with round or flattened culms (stems) solid at the nodes (joints) and two-ranked, alternate, parallel-veined leaves composed of two parts, the sheath which surrounds the culm like a tube split down one side, and the blade which is usually strap shaped, flat, folded, or with rolled margins. In grasses, the pith cavity is always closed at the nodes which are swellings at the limits of the internodes. The swellings, which are visible externally, do not belong to the culm but are the base of the leaf sheath and are termed "sheath nodes". They are to be found in all grasses with the exception of Molima, at least as long as the internode above has not completed its growth. In the growth of a grass, the seed culm sprouts first. Then side shoots are sent out, which are termed "stolons" or "tillers" and this operation is called "stooling". When the grass plant is young, the culm is practically all leaf. In the case of cereal grasses, the stem is really the leaves rolled together. A node then forms in the seed culm and, after the formation of this node or joint, which usually appears about an inch from the ground, the culm below becomes hollow and is then a true stem. After the formation of nodes in the seed culms, similar nodes are formed in the stolons. The formation of nodes is termed "jointing" as is well known in the art. In the case of wheat, it has been found that one or two periods of freezing are necessary before noding or jointing will occur.

The biological value of grasses gradually increases until a time just before jointing. At this stage of growth, the protein content, carotene content, sulphur containing cystine content, chlorophyll content, and phospholipin content are at their peak. The ashes of young grasses, cut at this stage of growth are very high in soluble compounds of phosphorus and calcium.

All factors seem to vary with the protein content so that the nitrogen content of grasses can be considered as an index of their biological value. As the growth proceeds, the biological value drops off and is lower at the bloom stage than during the noding or jointing stage. The undesirable factors such as fibre and silica vary inversely as a function of the desirable factors and these are highest at the bloom stage.

The life cycle of the grass plant may be divided into three distinct phases, namely:

1. The pre-jointing stage in which the substances of greatest biological value are formed and are stored in the growing leaves. The substances of greatest nutritive and biological value reach their peak, per pound of dry material, at or just before the jointing stage.
2. The jointing or noding stage in which the nodes are formed on the seed culm and the stolons or tiller culms. A plurality of successive nodes are formed on each culm. During this stage, the plant gradually increases in size and height and, as the noding or jointing proceeds, the biological value per pound of dry material decreases. The jointing stage continues until,
3. The reproductive stage, which commences when the plant blooms. With the appearance of the head on a culm, no further noding will take place on that culm. During this phase, which may be called the blooming stage, most of the biological value of the plant is transferred to the fruit or grain so that the biological value per pound of dry material of the plant is lowest at the ripening or culmination of the reproductive stage.

To obtain a feed of highest nutritive and biological value, grasses should be cut in proximity to the jointing stage, preferably at or just before the seed culm first nodes or joints. The noding or jointing of the seed culms is followed by the noding or jointing of the tiller culms. It will be readily appreciated that one aspect of my discovery is that young grasses have a high nutritive and biological value. The benefits of the high protein and vitamin content of young grasses can be obtained by cutting them any time before the bloom stage, and though the best results can be obtained by cutting at or before the first node forms, improved results can be obtained with grasses cut before the bloom stage and accordingly, these are to be considered within the scope of my invention.

It will be apparent that the time within which grasses may be cut for use in my invention is limited, since only at most fifty days will elapse between the planting of the seed and the arrival at the bloom stage.

In feeding, the correct nutritive ratio, that is, the ratio of protein to carbohydrates and fats is considered to be 1 to 8.7 for all species of animals. This ratio is that given in vol. 4, Annual Review of Biochemistry, pages 392, 393 (1935).

At present the protein content of diet is supplied to live stock and poultry by means of meat scrap, cottonseed meal, legumes and other conventional sources of protein. With the present sources of protein, probably this nutritive ratio is correct. The fact remains that, where it is possible to increase the protein factor of diet without harmful effects, live stock and poultry will fatten and grow. The energy factor of a diet does not appear to supply great elements of bone and tissue building qualities. Farmers generally have observed that, in the spring when young grasses have reached that stage of growth where jointing or noding has not yet occurred, that the live stock will fatten and grow. The bodily functions including those of reproduction, are greatly stimulated and the cattle assume a healthy and sleek appearance. My experiments, however, show that the protein content of high quality young grasses is in the neighborhood of 35% (dry basis). It will be observed that, since these are practically the sole articles of diet of an animal pasturing on high quality, immature grasses, that the nutritive ratio is about 1 to 2. Heretofore, proteins from plant sources have been considered inferior to animal proteins. The fact remains, however, that animals which instinctively seek young grasses in the spring, fatten on the same. Biochemists agree that a diet having a nutritive ratio of 1 to 2, employing the customary sources of protein would prove deleterious. Apparently, then, the proteins of young grasses must be phenomenally superior to those from any other source.

In general, proteins of young grasses are especially rich in essential amino-acids and sulphur containing cystine, which substance seems to influence metabolism. Young grasses are also especially rich in ascorbic acid (vitamin C), carotene (pro-vitamin A), and vitamin B complex. The phosphorus and calcium content of young grasses has also been found to be very high. Likewise such substances as chlorophyll and phospholipins are also present in high concentration.

One object of my invention is to provide a feed which may be available throughout the year, of high nutritive and biological value.

Another object of my invention is to provide a ready and convenient source of vitamins.

Another object of my invention is to provide a feed which will make available throughout the year a source of nourishment which would be otherwise available but a short period of time.

Another object of my invention is to provide a feed in which the vitamin content will be substantially stable through long periods of storage.

Other and further objects of my invention will appear from the following description.

In general, my invention contemplates the harvesting of young grasses before the inception of the bloom stage and their preservation in such manner as to retain substantially uninjured the vitamin and nutritive value.

As pointed out heretofore, for best results, the grasses should be harvested in proximity to the commencement of the jointing stage, but it is to be remembered that harvesting any time during the jointing stage, that is, before the beginning of the bloom stage, will produce good results and such harvesting is to be considered within the scope of my invention.

Any suitable method of preservation may be employed. The nutritive value may be made available in the form of juice. The juice may be preserved by means of edible preservatives or pickling agents, such as alcohol, organic acids, and the like, certain inorganic acids such as hydrochloric, sulphuric, and the like, and stored in air tight containers until use. Similarly, the juice may be pasteurized and then stored in containers. If desired, the juice may be condensed by being subjected to a partial evaporation of water, and the condensed juice may be preserved by means of preservatives or pasteurization, and stored in absence of air. If desired, freshly cut young grasses or the juice thereof may be preserved in cold storage.

I have found that the admixture of edible fats tends to prevent oxidation and destruction of the more labile constituents, and a proportion of from one tenth of one percent to ten percent or more of an edible oil tends to prevent the destruction of certain vitamins which are subject to oxidation. The juice of immature grasses may be preserved by natural lactic acid fermentation or by admixture therewith with raw, ripened buttermilk, as pointed out in co-pending application, Serial No. 48,056, of Lynwood H. Smith and myself, filed November 2, 1935; and the ripened grass juice and/or mixture of grass juice and buttermilk may be condensed and stored for further use. The grass juice may be preserved by means of sugars such as lextrose. The freshly harvested grass plants should be subjected to the juicing operation before the natural respiration of the leaf has ceased, since it is desirable to prevent destruction of the labile constituents which would occur if the juicing and preserving operations were unduly delayed.

In order to supply a certain amount of roughage, a portion of the fibre elements of the plant may be desirable. Accordingly, the whole plant may be pulped and partially dehydrated, and preserved in any of the manners heretofore mentioned. The pulping may be conducted to any desirable degree or, if desired, the plants may be finely chopped or comminuted and the finely divided leaves subjected to any desirable preservative method.

If desired, the pulped and/or comminuted young grasses may be subjected to the action of solvents such as oils, alcohols, chloroform, ethers, ketones and/or mixtures of the same, and the desirable vitamins and nutritive elements may be dissolved from the finely divided and comminuted grass plants and, after the evaporation of the solvents, a concentrate containing desirable vitamins and other substances may be preserved in solutions of edible oil or in any other desirable manner known to the art. This extract of valuable nutrients is especially desirable for human use. In preparing this extract, it is desirable to use only the highest quality of grasses grown in specially fertilized soil and harvested in close proximity to the beginning of the noding or jointing stage since at this point, as I have heretofore pointed out, the biological and vitamin content per pound of dry material is substantially at its peak.

In this way, it is possible to obtain concentrations of all vitamins necessary for good health and well being, heretofore unknown. Poultry fed with my grass juices or concentrates have developed apparent immunity to certain diseases such as leg weakness, paralysis, lukemia, enlarged livers, and the like. Birds having these diseases and fed on a diet containing my grass juices and concentrates have improved and, in some cases, ultimately recovered. It is known among poultrymen that egg production reaches the peak in April and May of each year, after which the production falls off rapidly. Hens which were fed on a diet containing my grass juices and concentrates maintained a higher level of laying, and the eggs were of greater biological value, having an increased vitamin content. Heretofore, when it was attempted to include greens in poultry diet, it was found that the yolks of the eggs assumed a green color, which eggs were termed by the trade as "grass eggs". In no case were eggs laid by hens fed my grasses and grass concentrates found to have this greenish yolk. Chicks hatched from eggs laid by hens fed with my grass concentrates and which chicks themselves were fed with my grass concentrates were remarkably healthy and proved to be phenomenal layers.

Hens having been fed my grass concentrates were killed for table use. The livers were found to have a dark mahogany color and to be of generally healthy appearance. The flesh of even old hens tasted like that of milk fed broilers.

Brood sows, fed these grass concentrates were much more prolific and the pigs were immune to paralysis, leg weakness, scours, and other diseases which have, in the last few years, caused a mortality of about 40 percent throughout the country. These diseases were not prevented in a group of pigs which were fed a grain ration supplied with all of the known vitamins, that is, vitamin A, vitamin B complex, vitamins C, D, E, and G. While I do not want to be bound by any theories, it would appear that there must be some beneficial vitamins or nutritive elements in my young grasses which are as yet not known to nutritional science.

It will be seen that I have accomplished the objects of my invention. I am able to provide a feed or fodder having an exceptional and phenomenal nutritive and biological value, available the year round for both men and animals.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A feed comprising grass juice obtained from grass harvested in close proximity to the jointing stage.

2. A feed comprising preserved grass juice obtained from grass harvested substantially at the jointing stage.

3. A composition of matter comprising condensed juice of a grass harvested just before the formation of the first node.

4. A composition of matter comprising preserved condensed juice of grass harvested in close proximity to the jointing stage.

5. A composition of matter comprising in combination an intimate mixture of a minor proportion of an edible oil and a major proportion of juice of a grass harvested in close proximity to the jointing stage.

6. A method of preparing a feed which comprises subjecting freshly harvested grass plants cut in proximity to the jointing stage of their growth to a juicing operation.

7. A feed comprising the soluble constituents of grass cut in proximity to the jonting stage of its growth.

CHARLES F. SCHNABEL.